(12) United States Patent
Doi

(10) Patent No.: US 7,160,587 B2
(45) Date of Patent: Jan. 9, 2007

(54) PLASTIC SUBSTRATE FOR DISPLAY AND DISPLAY ELEMENT

(75) Inventor: Toru Doi, Mie (JP)

(73) Assignee: Tosoh Corporation, Shunan (JP)

( * ) Notice: Subject to any disclaimer, the term of this patent is extended or adjusted under 35 U.S.C. 154(b) by 43 days.

(21) Appl. No.: 10/921,212

(22) Filed: Aug. 19, 2004

(65) Prior Publication Data

US 2005/0059777 A1    Mar. 17, 2005

(30) Foreign Application Priority Data

Aug. 20, 2003  (JP) ............................. 2003-207976
Jul. 8, 2004   (JP) ............................. 2004-201584

(51) Int. Cl.
*B32B 27/28*    (2006.01)
*B32B 27/36*    (2006.01)

(52) U.S. Cl. .................. 428/1.6; 428/522; 428/523; 349/158; 526/321; 526/323.1; 526/324; 526/325

(58) Field of Classification Search ................. 428/1.6, 428/522–523; 349/158; 526/319, 321, 323.1, 526/324–325
See application file for complete search history.

(56) References Cited

U.S. PATENT DOCUMENTS

| | | | | |
|---|---|---|---|---|
| 5,426,131 A | * | 6/1995 | Katsamberis | ................. 522/16 |
| 5,612,432 A | * | 3/1997 | Taniguchi et al. | ........... 526/262 |
| 5,800,912 A | * | 9/1998 | Ogiso et al. | ................. 428/323 |
| 5,851,422 A | * | 12/1998 | Saito et al. | ............. 252/299.01 |
| 5,914,283 A | * | 6/1999 | Yamada et al. | ............. 442/117 |
| 6,222,003 B1 | * | 4/2001 | Hosoi et al. | ................. 528/196 |

FOREIGN PATENT DOCUMENTS

| | | |
|---|---|---|
| GB | 0902500 A2 * | 3/1999 |
| JP | 61-28513 | 2/1986 |
| JP | 61-34007 | 2/1986 |
| JP | 62-99720 | 5/1987 |
| JP | 62-235901 | 10/1987 |
| JP | 62-235902 | 10/1987 |
| JP | 62-235919 | 10/1987 |
| JP | 2-214731 | 8/1990 |
| JP | 2-269130 | 11/1990 |

OTHER PUBLICATIONS

Asami et al., JPO Website Machine English Translation of JP 2002145940 A, May 22, 2002.*

* cited by examiner

*Primary Examiner*—Rena Dye
*Assistant Examiner*—Sow-Fun Hon
(74) *Attorney, Agent, or Firm*—Oblon, Spivak, McClelland, Maier & Neustadt, P.C.

(57) ABSTRACT

A plastic substrate for display, having little coloration and excellent in optical characteristics, heat resistance, resistance to thermal coloration and mechanical properties, and a display element using the same are provided. The plastic substrate for display comprises a fumaric acid diester resin which comprises 60 mol % or more of a fumaric acid diester residue unit represented by the following formula (1):

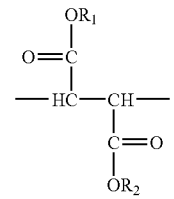

wherein $R_1$ and $R_2$ each independently represent a branched alkyl group or a cyclic alkyl group, having 3–12 carbon atoms, and has a number average molecular weight of 1,000–500,000 as determined by a gel permeation chromatography and converted into standard polystyrene, the substrate having a thickness 30–600 μm.

24 Claims, No Drawings

PLASTIC SUBSTRATE FOR DISPLAY AND DISPLAY ELEMENT

FIELD OF THE INVENTION

The present invention relates to a plastic substrate for display showing little coloration and excellent in optical characteristics, heat resistance, resistance to thermal discoloration and mechanical properties, and a display element using the same.

Description of the Related Art

Flat panel displays represented by a liquid crystal display, an organic EL display, a plasma display, an electronic paper etc. are showing rapid growth as display elements for example in a flat panel television, a computer monitor, a notebook personal computer, a mobile telephone, and a car navigation device, exploiting features of a thin structure, a light weight, a low electric power consumption and the like. Glass has been employed as a substrate material for such display elements. However, glass is associated with drawbacks such as a large weight because of a high specific gravity, a difficulty in forming a thin substrate as it is easily cracked because of a low impact strength, and a lack of flexibility. A display utilizing a plastic substrate is being actively developed principally in the liquid crystal display and the organic EL display, since such plastic substrate enables a thin and light-weight structure and is anticipated to lead to a flexible display.

However, a producing process for a liquid crystal display or an organic EL display requires a high process temperature of 150 to 200° C. or more as in a step of forming a thin film transistor (hereinafter represented as TFT), a panel adhering step, a step of forming an alignment film, a step of forming a transparent electrode etc. Therefore the substrate for the display is required to have a high heat resistance. Also the substrate for the display is required to have excellent optical characteristics, as the requirements for the display characteristics of the display are becoming stricter year after year.

Polycarbonate (hereinafter represented as PC) is known as a representative heat resistant transparent plastic material, but PC, having a glass transition temperature of about 150° C., is insufficient in the heat resistance, for use as a substrate for display, particularly a substrate for an active display utilizing TFT. A typical material currently under investigation is polyether sulfone (hereinafter represented as PES). PES is superior in the heat resistance among transparent resins, with a glass transition temperature of 220° C., but is colored from pale yellow to brown and is insufficient in color and transparency. Also it has a high photoelastic constant, and shows a birefringence (optical anisotropy) even by a slight stress or a strain. It is also insufficient in the optical characteristics such as a large wavelength dependence of the refractive index, and does not sufficiently meet the characteristics required for the plastic substrate.

On the other hand, a polymer formed by a fumaric acid diester was found by Otsu et al. in 1981 (for example, Polymer Preprints, Japan, 30, 832 (1981)), and many reports have been made on a polymerization behavior of fumaric acid diester (for example, Radical Polymerization Handbook, p.159 (STS Co.)). Also optical materials formed by a fumaric acid diester polymer are disclosed, including an optical lens, a prism lens, and an optical fiber (for example, JP-A-61-028513 and JP-A-61-034007). There are also disclosed a contact lens (for example, JP-A-62-099720 and JP-A-62-235919) and a synthetic resin lens (for example, JP-A-62-235901 and JP-A-62-235902) formed by a fumaric acid diester polymer. Also there are disclosed a substrate having a polymer alignment film for a liquid crystal display, utilizing a monomolecular film of a fumaric acid diester polymer (for example, JP-A-02-214731), a method for producing an ultra thin film of a fumaric acid diester polymer, with applications for an electric device, a patterning, a microlithography, an optical element (a binder resin for a light guide or a non-linear three-dimensional element) (for example, JP-A-02-269130) and so on.

In the prior technology, however, a plastic substrate for display formed by a fumaric acid diester resin of a specified structure has not been proposed.

SUMMARY OF THE INVENTION

Accordingly, one object of the present invention is to provide a plastic substrate for display comprising a fumaric acid diester resin which comprises a specified fumaric acid diester residue unit, the substrate showing little coloration and being excellent in optical characteristics, heat resistance and mechanical properties.

Another object of the present invention is to provide a display element using the plastic substrate.

As a result of intensive investigation to overcome the above problems, it has been found that a plastic substrate for display comprising a fumaric acid diester resin which comprises a specified fumaric acid diester residue unit has little coloration, excellent optical characteristics, heat resistance and mechanical properties. It has also been found that further excellent plastic substrate for display can be obtained by forming a laminate having at least one gas barrier layer and/or at least one hard coat layer. The present invention has been completed based on those findings.

The present invention provides a plastic substrate for display, comprising a fumaric acid diester resin which comprises 60 mol % or more of a fumaric acid diester residue unit represented by the following formula (1):

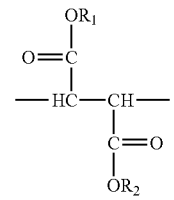

wherein $R_1$ and $R_2$ each independently represent a branched alkyl group or a cyclic alkyl group, having 3–12 carbon atoms, and has a number average molecular weight of 1,000–500,000 as determined by a gel permeation chromatography and converted into standard polystyrene, the substrate having a thickness 30–600 µm.

The present invention further provides a display element using the plastic substrate.

DETAILED DESCRIPTION OF THE INVENTION

The plastic substrate for display and the display element using the same, according to the present invention are described in detail below.

The plastic substrate for display of the present invention comprises a fumaric acid diester resin which comprises 60 mol % or more of a fumaric acid diester residue unit represented by the formula (1), and has a number average molecular weight of 1,000–500,000 as determined by a gel permeation chromatography and converted into standard polystyrene. Ester substituents $R_1$ and $R_2$ of the fumaric acid diester residue unit each independently represent a branched alkyl group or a cyclic alkyl group, having 3–12 carbon atoms, which may be substituted with a halogen group such as fluorine or chlorine, an ether group, an ester group or an amino group. Examples of the ester substituent include an isopropyl group, a s-butyl group, a t-butyl group, a s-pentyl group, a t-pentyl group, a s-hexyl group, a t-hexyl group, a cyclopropyl group, a cyclopentyl group and a cyclohexyl group. Of those, an isopropyl group, a s-butyl group, a t-butyl group, a cyclopentyl group or a cyclohexyl group is preferable for attaining excellent heat resistance and mechanical properties, and an isopropyl group is particularly preferable for attaining an excellent balance of the heat resistance and the mechanical properties. In the case that $R_1$ or $R_2$ is a linear alkyl group or has more than 12 carbon atoms, the fumaric acid diester resin will have a low glass transition temperature, thus resulting in low heat resistance or inferior mechanical properties of the plastic substrate. Specific examples of the fumaric acid diester residue unit include a diisopropyl fumarate residue, a di-s-butyl fumarate residue, a di-t-butyl fumarate residue, a di-s-pentyl fumarate residue, a di-t-pentyl fumarate residue, a di-s-hexyl fumarate residue, a di-t-hexyl fumarate residue, a dicyclopropyl fumarate residue, a dicyclopentyl, fumarate residue, and a dicyclohexyl fumarate residue, preferably a diisopropyl fumarate residue, a di-s-butyl fumarate residue, a di-t-butyl fumarate residue, a dicyclopentyl fumarate residue, and a dicyclohexyl fumarate residue. Of those, a diisopropyl fumarate residue is particularly preferable.

The fumaric acid diester resin constituting the plastic substrate for display of the invention comprises 60 mol % or more of a fumaric acid diester residue unit represented by the formula (1), and is substantially a resin comprising 60 mol % or more of a fumaric acid diester residue unit represented by the formula (1), and 40 mol % or less of a residue unit of a monomer copolymerizable with the fumaric acid diester. Examples of the residue unit of a monomer copolymerizable with the fumaric acid diester include one or more of a styrenic residue such as a styrene residue or a-methylstyrene residue; an acrylic acid residue; an acrylic acid ester residue such as a methyl acrylate residue, an ethyl acrylate residue, or a butyl acrylate residue; a methacrylic acid residue; a methacrylic acid ester residue such as a methyl methacrylate residue, an ethyl methacrylate residue or a butyl methacrylate residue; a vinyl ester residue such as a vinyl acetate residue, or a vinyl propionate residue; an acrylonitrile residue; a methacrylonitrile residue; an olefin residue such as an ethylene residue, and a propylene residue. The fumaric acid diester resin preferably comprises 80 mol % or more of the fumaric acid diester residue unit represented by the formula (1), and is particularly preferably 100 mol % of a fumaric acid diester homopolymer for obtaining a plastic substrate for display excellent in heat resistance and mechanical properties. In the case that the amount of the fumaric acid diester residue unit represented by the formula (1) is less than 60 mol %, the heat resistance and the mechanical properties become poor.

The fumaric acid diester resin constituting the plastic substrate for display of the present invention has a number average molecular weight (Mn), obtained from a dissolution curve measured by a gel permeation chromatography (hereinafter called GPC) and converted into standard polystyrene, in a range of $1\times10^3$ to $5\times10^6$, preferably $1\times10^4$ to $2\times10^5$, for attaining excellent mechanical properties and an excellent molding property at film formation. Mn value exceeding $5\times10^6$ deteriorates a surface property of the plastic substrate for display obtained, and Mn value less than $1\times10^3$ results in a deficient mechanical strength in the plastic substrate for display obtained.

The fumaric acid diester resin constituting the plastic substrate for display of the present invention can be produced by any method as long as such fumaric acid diester resin can be obtained. For example, it can be produced by a radical polymerization of fumaric acid diesters, optionally in combination with a monomer copolymerizable with the fumaric acid diesters. The fumaric acid diesters in such case can be, for example, diisopropyl fumarate, di-s-butyl fumarate, di-t-butyl fumarate, di-s-pentyl fumarate, di-t-pentyl fumarate, di-s-hexyl fumarate, di-t-hexyl fumarate, dicyclopropyl fumarate, dicyclopentyl fumarate, or dicyclohexyl fumarate. The monomer copolymerizable with the fumaric acid diesters can be, for example, styrenes such as styrene or α-methylstyrene; acrylic acid; an acrylic acid esters such as methyl acrylate, ethyl acrylate or butyl acrylate; methacrylic acid; methacrylic acid esters such as methyl methacrylate, ethyl methacrylate or butyl methacrylate; vinyl esters such as vinyl acetate or vinyl propionate; acrylonitrile; methacrylonitrile; and olefins such as ethylene or propylene. Those can be used alone or as mixtures thereof.

The radical polymerization of such monomers can be performed by conventional polymerization method. For example, bulk polymerization, solution polymerization, suspension polymerization, precipitation polymerization or emulsion polymerization can be either employed.

A polymerization initiator for the radical polymerization can be organic peroxides such as benzoyl peroxide, lauryl peroxide, octanoyl peroxide, acetyl peroxide, di-t-butyl peroxide, t-butylcumyl peroxide, dicumyl peroxide, t-butyl peroxiacetate, or t-butyl peroxibenzoate; or azo initiators such as 2,2'-azobis(2,4-dimethylvaleronitrile), 2,2'-azobis(2-butyronitrile), 2,2'-azobisisobutyronitrile, dimethyl-2,2'-azobisisobutyrate, or 1,1'-azobis(cyclohexane-1-carbonitrile).

A solvent that can be used in the solution polymerization or precipitation polymerization is not particularly restricted, and can be an aromatic solvent such as benzene, toluene or xylene; an alcohol such as methanol, ethanol, propyl alcohol or butyl alcohol; cyclohexane, dioxane, tetrahydrofuran, acetone, methyl ethyl ketone, dimethylformamide or isopropyl acetate, or a mixture thereof.

A polymerization temperature for the radical polymerization can be suitably selected according to a decomposition temperature of the polymerization initiator, and is generally selected within a range of 40–150° C.

The plastic substrate for display of the present invention has a thickness of 30–600 μm, preferably 100–300 μm. A substrate thickness less than 30 μm reduces mechanical properties and a supporting property of the substrate. On the other hand, a substrate thickness exceeding 600 μm increases the weight of the substrate and also undesirably reduces productivity, such as a long time required for elimination of the solvent from the substrate.

In case of using the plastic substrate for display of the present invention as a plastic substrate for a liquid crystal display, it preferably has an excellent transparency, low haze and low retardation. Conventional heat resistant films such as PES have a yellowish color and deteriorates the display quality of the liquid crystal display. Particularly for use as the plastic substrate for a liquid crystal display, an optical transmittance at a measuring wavelength of 400 nm which is important for the yellowish hue is preferably 80% or more, more preferably 85% or more and most preferably 90% or more. A haze indicating the turbidity of the substrate is preferably 2% or less for obtaining a sharp image quality, more preferably 1% or less. The haze is measured based on JIS K7105 (1981). Amount of retardation measured from the front side of the substrate is preferably 10 nm or less for providing the substrate with satisfactory display characteristics, more preferably 5 nm or less, and an unevenness in the thickness is preferably 10 μm or less, more preferably 5 μm or less and most preferably 2 μm or less.

The plastic substrate for display of the present invention can be produced by any production method capable of producing the plastic substrate for display of the present invention and can be produced by an ordinary molding method such as a melt extrusion method, a solution casting method, or a press molding method. Of those, a solution casting method is preferred because a plastic substrate for display with excellent optical characteristics, heat resistance and surface properties can be obtained.

The solution casting method is conducted by casting a resin solution (generally called "dope") on a supporting substrate and heating it to evaporate the solvent, thereby obtaining a plastic substrate. The method of casting is achieved by, for example, a T-die method, a doctor blade method, a bar coater method, a roll coater method or a lip coater method. Industrially, a method of continuously extruding a dope from a die onto a belt- or drum-shaped supporting substrate is most commonly employed. The supporting substrate used can be a glass substrate, a metal substrate such as a stainless steel or a ferrotype plate, or a plastic substrate such as of polyethylene terephthalate. For continuously forming a substrate with highly excellent surface and optical properties on industrial scale, a metal substrate with a mirror finished surface is preferred.

In producing a plastic substrate for display having a high transparency and excellent in precision of thickness and surface smoothness by the solution casting method, a viscosity of the resin solution is an extremely important factor and depends on the density and molecular weight of the resin and the type of the solvent. In the case of producing the plastic substrate for display of the present invention by the solution casting method, the resin solution preferably has a viscosity of 500–50,000 cps for obtaining a plastic substrate for display excellent in surface smoothness and precision of thickness, more preferably 700–30,000 cps, and most preferably 1,000–10,000 cps.

The plastic substrate for display of the present invention will be exposed to an environment of about 200° C. in display production steps such as a TFT forming step, an alignment film forming step, a panel adhesion step, etc., and from this, preferably has a dimensional stability when the substrate is returned from such high temperature to the room temperature. For such conditions, rate of dimensional change upon returning to the room temperature after maintaining at 200° C., or at 220° C. for 1 hour, is preferably 0.1% or less in absolute value, more preferably 0.05% or less, and most preferably 0.01% or less. For attaining such dimensional stability to the temperature change, a heat treatment is effective and is preferably conducted at 180° C. or higher, more preferably at 200° C. or higher, and most preferably at 220° C. or higher.

The plastic substrate for display of the present invention is preferably formed by a monoaxial or biaxial stretching method in order to obtain excellent dimensional stability and optical characteristics. The monoaxial stretching method can be achieved by, for example, a stretching method with a tenter, a stretching method by pressing with a calender, a stretching method between rollers, a free-width monoaxial stretching method or a fixed-width monoaxial stretching method. The biaxial stretching method can be achieved by, for example, a stretching method with a tenter, a successive biaxial stretching method, or a simultaneous biaxial stretching method. In conducting the stretching method, it is preferably conducted within a temperature range of from −20° C. to +30° C. of the glass transition temperature of the fumaric acid diester resin.

The plastic substrate for display of the present invention may have a laminate structure of two or more layers if necessary, and, in such case, the laminate may be formed by layers of fumaric acid diester resin, or by a layer of fumaric acid diester resin and a layer of other resin. Such other resin can be, for example, polyethersulfone, polyarylate, polyethylene terephthalate, polyethylene naphthalate, polycarbonate, cyclic polyolefin, a maleimide resin or a fluorinated resin.

The plastic substrate for display of the present invention, when used as a display element, is preferably a laminate having at least a gas barrier layer to protect a liquid crystal, a light-emission layer or an electrode substrate constituting the display element. The gas barrier layer can be formed by, for example, an inorganic layer such as silicon oxide, silicon nitride, silicon oxide nitride, aluminum oxide, tantalum oxide or aluminum; or an organic film layer such as polyvinyl alcohol or polyolefin, and preferably is mainly constituted of a component selected from silicon oxide, silicon nitride and silicon oxide nitride, because optical characteristics, a gas barrier property and a dimensional stability important for a high definition display are excellent. The gas barrier layer has a thickness of preferably 1–1,000 nm, more preferably 10–300 nm, in the case of the inorganic film, in order to obtain a gas barrier layer providing a satisfactory production efficiency and showing a sufficient gas barrier performance. In case of the organic layer, it has a thickness of preferably 0.1–100 μm, more preferably 1–50 μm. The gas barrier layer may have a laminate structure or a multilayer structure involving the organic layer and the inorganic layer. The gas barrier layer can be formed by conventional method such as evaporation, sputtering, PECVD, CatCVD, coating or laminating.

The plastic substrate for display of the present invention is also preferably formed as a laminate having at least a hard coat layer in order to improve surface properties, a scratch resistance, and a chemical resistance at TFT formation. The hard coat layer can be formed by, for example, a silicone resin, an acrylic resin, an acryl-silicone resin, an ultraviolet curable resin, or an urethane hard coat material, which can be used alone or as mixtures of two or more thereof. Of those, an ultraviolet curable resin is preferred because of excellent transparency, scratch resistance and chemical resistance. The ultraviolet curable resin is preferably at least one ultraviolet curable resin selected from an ultraviolet curable acryl-urethane, an ultraviolet curable epoxy acrylate, an ultraviolet curable (poly)ester acrylate, and an ultraviolet curable oxetane. The hard coat layer has a thickness of preferably 0.1–100 μm, more preferably 1–50 μm, and most preferably 2–20 μm, for improving scratch resistance, surface property and light weight,. It is also possible to apply a primer treatment between the plastic substrate and the gas barrier layer and/or the hard coat layer.

The plastic substrate for display of the present invention preferably contains an antioxidant for improving the thermal stability. The antioxidant can be, for example, a hindered phenol antioxidant, a phosphor-based antioxidant, a sulfur-based antioxidant, a lactone antioxidant, an amine-based antioxidant, a hydroxylamine-based antioxidant, a vitamin E-based antioxidant, or another antioxidant. Those may be used alone or in combination thereof. The hindered phenol antioxidant is preferable for improving the thermal stability, and a combined use of the hindered phenol antioxidant and the phosphor-based antioxidant is preferable for improving the thermal stability and preventing a thermal coloration. In such a combined use, it is preferred to mix the phosphor-based antioxidant in an amount of 0–1,000 parts by weight, preferably 100–500 parts by weight, per 100 parts by weight of the hindered phenol antioxidant. The antioxidant is used in an amount of preferably 0.01–10 parts by weight, more preferably 0.5–3 parts by weight, per 100 parts by weight of the fumaric acid diester resin, because of excellent thermal stability and resistance to thermal coloration in high temperature exposure, and also no possibility of causing a surface roughness of the substrate, a bleeding and an increase in haze.

Examples of the hindered phenol antioxidant include pentaethythritol-tetrakis(3-(3,5-t-butyl-4-hydroxyphenyl) propionate), thiodiethylene-bis(3-(3,5-t-butyl-4-hydroxyphenyl)propionate, octadecyl-3-(3,5-t-butyl-4-hydroxyphenyl)propionate, N,N'-hexan-1,6-diylbis(3-(3,5-t-butyl-4-hydroxyphenyl)propionamide), diethyl((3,5-bis(1,1-dimethylethyl)-4-hydroxyphenyl)methyl) phosphate, 3,3,', 3",5,5',5"-hexa-t-butyl-a,a',a"-(mesitylen-2,4,6-triyl)tri-p-cresol, ethylenebis(oxyethylene)bis(3-(5-t-butyl-4-hydroxy-m-tolyl)propionate), hexamethylene-bis(3-(3,5-di-t-butyl-4-hydroxyphenyl)propionate), 1,3,5-tris(3,5-di-t-butyl-4-hydroxybenzyl)-1,3,5-triazin-2,4,6(1H, 3H, 5H)-trione, 1,3, 5-tris((4-t-butyl-3-hydroxy-2,6-xylyl)methyl)-1,3,5-triazin-2,4,6(1H, 3H, 5H)-trione, 2,6-di-t-butyl-4-(4,6-bis(octylthio)-1,3,5-triazin-2-ylamino)phenol, and 3,9-bis(2-(3-(3-t-butyl-4-hydroxy-5-methylphenyl)pripionyloxy)-1,1-dimethylethyl-2,4,8,10-tetraoxaspiro(5,5)undecane.

Examples of the phosphor-based antioxidant include tris (2,4-di-t-butylphenyl)phosphite, bis(2,4-bis(1,1-dimethylethyl)-6-methylphenyl)ethyl ester phosphite, tetrakis(2,4-di-t-butylphenyl)-(1,1-biphenyl)-4,4'-diylbisphosphonite, bis (2,4-di-t-butylphenyl)pentaerythritol diphosphite, bis(2,6-di-t-butyl-4-methylphenyl)pentaerythritol diphosphite, bis (2,4-dicumylphenyl)pentaerythritol diphosphite, tetrakis(2, 4-di-t-butylphenyl)(1,1-biphenyl)-4,4'-diyl bisphosphonite, and di-t-butyl-m-cresyl phosphonite.

Examples of the sulfur-based antioxidant include didodecyl-3,3'-thiodipropionate, and dioctadecyl-3,3'-thiodipropionate.

Examples of the lactone antioxidant include a reaction product of 3-hydroxy-5,7-di-t-butyl-furan-2-one and o-xylene.

The plastic substrate may also contain a hindered amine photostabilizer, which has a molecular weight of preferably 1,000 or higher, more preferably 1,500 or higher, for obtaining a plastic substrate for display with an excellent effect for suppressing thermal coloration. The hindered amine photostabilizer is used in an amount of preferably 0.01–1.5 parts by weight, more preferably 0.05–1 part by weight, and most preferably 0.1–0.5 parts by weight, per 100 parts by weight of the fumaric acid diester resin in order to obtain a plastic substrate for display excellent in a thermal coloration preventing effect and a photostabilizing effect. Examples of the hindered amine photostabilizer include poly((6-morpholine-s-triazin-2,4-diyl)((2,2,6,6-tetramethyl-4-piperidyl)imino) hexamethylene((2,2,6,6-tetramethyl-4-piperidyl)imino) (molecular weight: 1,600), poly((6-(1,1,3,3-tetramethylbutyl)amino-1,3,5-triazin-2,4-diyl)((2,2,6,6-tetramethyl-4-piperidyl)imino)hexamethylene((2,2,6,6-tetramethyl-4-piperidyl)imino)) (molecular weight: 2,000–3,100), a polycondensate of dibutylamine-1,3,5-triazine-N,N'-bis(2,2, 6,6-tetramethyl-4-piperidyl)-1,6-hexamethylenediamine and N-(2,2,6,6-tetramethyl-4-piperidyl)butylamine (molecular weight: 2,600–3,400), N,N'-bis(3-aminopropyl)ethylenediamine-2,4-bis(N-butyl-N-(1,2,2,6,6-poentamethyl-4-piperidyl)amino)-6-chloro-1,3,5-triazine condensate (molecular weight: 2,000 or higher), and dimethyl succinate-1-(2-hydroxyethyl)-4-hydroxy-2,2,6,6-tetramethylpiperidine condensate (molecular weight: 3,100–4,000). Those may be used alone or as mixtures of two or more thereof.

The plastic substrate for display of the present invention may contain an ultraviolet absorber for the purpose of preventing deterioration of a liquid crystal compound, etc. The ultraviolet absorber which may be added is a benzotriazole, benzophenone, triazine or benzoate type ultraviolet absorber. The benzotriazole ultraviolet absorber can be at least one compound selected from 2-(2H-benzotriazol-2-yl)-p-cresol, 2-(2H-benzotriazol-2-yl)-4,6-bis(1-methyl-1-phenylethyl)phenol, 2-(5-chloro(2H)-benzotriazol-2-yl)-4-methyl-6-(t-butyl)phenol, 2,4-di-t-butyl-6-(5-chlorobenzotriazol-2-yl)phenol, 2-(2H-benzotriazol-2-yl)-4, 6-di-t-pentylphenol, 2-(2H-benzotriazol-2-yl)-4-(1,1,3,3-tetramethylbutyl)phenol, and 2,2'-methylenebis(6-(2H-benzotriazol-2-yl)-4-( 1,1,3,3-tetramethylbutyl)phenol. The benzophenone ultraviolet absorber can be at least a compound selected from 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2,2-dihydroxy-4-methoxybenzophenone, 2,2,4,4-tetrahydroxybenzophenone, and 2,2-dihydroxy-4,4-dimethoxybenzophenone. The triazine ultraviolet absorber can be 2-(4,6-diphenyl-1,3,5-triazin-2-yl)-5-((hexyl)oxy)phenol. The benzoate ultraviolet absorber can be 2,4-di-t-butylphenyl-3,5-di-t-butyl-4-hydroxybenzoate, or 2,4-di-t-pentylphenol-3,5-di-t-butyl-4-hydroxybenzoate. These ultraviolet absorbers may be used alone or as mixtures of two or more thereof. The ultraviolet absorber may be added not only to the resin substrate but also to a hard coat material.

The plastic substrate for display of the present invention may further contain a polymer, a surfactant, a polymer electrolyte, a conductive complex, an inorganic filler, a pigment, a dye, an antistatic agent, an antiblocking agent, a lubricant, etc., within a range not exceeding the scope of the present invention.

The plastic substrate for display of the present invention can be used as a substrate for a display element or a liquid crystal display element, and a color filter can be formed on the plastic substrate by conventional method such as a photolithographic method, a printing method or an electrodeposition method. TFT can be formed on the plastic substrate by conventional technology, for example, a method described in S.I.D. 103 Digest p.992(2003).

The plastic substrate for display of the present invention has excellent optical characteristics such as a low coloration, an excellent transparency, a small photoelastic constant scarcely causing a birefringence, and a large Abbe's number. It also has an excellent heat resistance and is suitable for use in a display element.

The present invention is described in more detail by reference to the following Examples, but it should be understood that the invention is not construed as being limited thereto.

Methods of analysis and evaluation employed in the Examples are explained below.

Measurement of Number Averaged Molecular Weight

It was determined, as a value converted into standard polystyrene, from a dissolution curve measured with a gel permeation chromatography (GPC) (trade name: HLC-802A, manufactured by TOSOH CORPORATION.).

Measurement of Glass Transition Temperature

It was measured by a differential scanning calorimeter (trade name: DSC2000, manufactured by Seiko Instruments Inc.) with a temperature elevating rate of 10° C./min.

Measurement of Optical Transmittance

As an evaluation of transparency, a total transmittance was measured according to JIS K7105 (1981 edition).

Measurement of Haze

As an evaluation of transparency, a haze was measured according to JIS K7105 (1981 edition).

Measurement of Refractive Index and Abbe's Number

Measurements were made according to JIS K7142 (1981 edition).

Measurement of Photoelastic Coefficient

Photoelastic constant was measured by a optical rheometer (trade name HRS-100, manufactured by Oak Mfg. Co.) with a tensile speed of 1%/s.

Measurement of Retardation Amount

Retardation amount was measured with a polarizing microscope utilizing a Senarmont compensator (Senarmont interference method) described in "Kobunshi-Sozai no Henko-kenbikyo Nyuumon" (Hiroshi Awaya, published by Agune Gijutsu Center, chapter 5, pp.78–82 (2001)).

Evaluation of Thermal Resistance

Thermal resistance of resin was evaluated by placing a prepared substrate in an oven at a predetermined temperature for 1 hour, and temperature showing no deformation or coloration was determined as maximum temperature.

SYNTHESIS EXAMPLE 1

Production Example of Diisopropyl Fumarate Homopolymer 1,800 g of distilled water containing partially saponified polyvinyl alcohol by 0.2 wt. %, 300 g of diisopropyl fumarate and 0.35 g of dimethyl azobisisobutyrate as a polymerization initiator were charged in a 3 liters autoclave, and subjected to a suspension polymerization under conditions of a polymerization temperature of 55° C. and a polymerization time of 50 hours. Polymer particles obtained were recovered by filtration, sufficiently washed with methanol and dried at 80° C. to obtain a diisopropyl fumarate homopolymer. The diisopropyl fumarate homopolymer obtained had a number average molecular weight of 60,000.

SYNTHESIS EXAMPLE 2

Production Example of di-n-butyl Fumarate Homopolymer

A di-n-butyl fumarate homopolymer was obtained in the same manner as in Synthesis Example 1 above except that diisopropyl fumarate was replaced by di-n-butyl fumarate.

EXAMPLE 1

The diisopropyl fumarate homopolymer obtained in Synthesis Example 1 was dissolved in chloroform to obtain a 20 wt. % solution. 0.35 parts by weight of tris(2,4-di-t-butylphenyl)phosphite and 0.15 parts by weight of pentaerythritol-tetrakis(3-(3,5-di-t-butyl-4-hydroxyphenyl)propionate) as antioxidants, per 100 parts by weight of the diisopropyl fumarate homopolymer, was added to the solution, and the resulting mixture was cast from a T-die on a supporting substrate of a solution casting apparatus, and stepwise dried at drying temperatures of 40° C., 80° C. and 120° C. to obtain a plastic substrate for display having a width of 300 mm and a thickness of 120 μm.

The plastic substrate for display obtained was cut into a square shape with a side of 200 mm, and subjected to measurements of the total transmittance, transmittance at a wavelength of 400 nm, haze, refractive index, Abbe's number, photoelastic coefficient, retardation amount and unevenness in the retardation. Also the heat resistance was evaluated. The results obtained are shown in Table 1.

The plastic substrate for display obtained has excellent optical characteristics, showing high transparency with low yellowness, low haze, small photoelastic constant and small retardation, and is also excellent in uniformity with low unevenness in the substrate thickness and low unevenness in the retardation. It also has excellent heat resistance of 220° C.

EXAMPLE 2

The diisopropyl fumarate homopolymer obtained in Synthesis Example 1 was dissolved in tetrahydrofuran (THF) to obtain a 20 wt. % solution. 0.35 parts by weight of tris(2, 4-di-t-butylphenyl)phosphite and 0.15 parts by weight of pentaerythritol-tetrakis(3-(3,5-di-t-butyl-4-hydroxyphenyl) propionate) as antioxidants, per 100 parts by weight of the diisopropyl fumarate homopolymer, was added to the solution, and the resulting mixture was cast from a T-die on a supporting substrate of a solution casting apparatus, and stepwise dried at drying temperatures of 40° C., 80° C. and 120° C. to obtain a plastic substrate for display having a width of 300 mm and a thickness of 150 μm.

The plastic substrate for display obtained was cut into a square shape with a side of 5 cm, and then stretched with a two-axis stretching machine (manufactured by Imoto Seisakusho Co.) under a condition of 180° C. to obtain a plastic substrate for display having a thickness of 100 μm. The plastic substrate was subjected to measurements of the total transmittance, transmittance at a wavelength of 400 nm, haze, refractive index, Abbe's number, photoelastic coefficient, retardation amount and unevenness in the retardation. Also the heat resistance was evaluated. The results obtained are shown in Table 1.

The plastic substrate for display obtained has excellent optical characteristics, showing high transparency with low yellowness, low haze, small photoelastic constant and small retardation, and is also excellent in uniformity with low unevenness in the substrate thickness and low unevenness in the retardation. It also has an excellent heat resistance of 220° C.

COMPARATIVE EXAMPLE 1

A plastic substrate having a thickness of 120 μm was obtained in the same manner as in Example 1 using polyether sulfone (manufactured by Aldrich Chemical Co.).

The plastic substrate obtained was subjected to measurements of the total transmittance, refractive index, Abbe's number, photoelastic coefficient, and retardation. Also the heat resistance was evaluated. The results obtained are shown in Table 1.

COMPARATIVE EXAMPLE 2

A plastic substrate having a thickness of 120 μm was obtained in the same manner as in Example 1 using polycarbonate (manufactured by Aldrich Chemical Co.).

The plastic substrate obtained was subjected to measurements of the total transmittance, refractive index, Abbe's number, photoelastic coefficient, and retardation. Also the heat resistance was evaluated. The results obtained are shown in Table 1.

COMPARATIVE EXAMPLE 3

It was attempted to produce a plastic substrate using the di-n-butyl fumarate homopolymer obtained in Synthesis Example 2 in the same manner as in Example 1, but the plastic substrate was softened in the drying step. As a result, a satisfactory plastic substrate could not be obtained. Separately, a substrate composed of the di-n-butyl fumarate homopolymer was separately subjected to the measurement of heat resistant temperature. As a result, it was found to be low as about 20° C.

EXAMPLES 3 TO 8

Pentaerythritol-tetrakis(3-(3,5-di-t-butyl-4-hydroxyphenyl)propionate) as a hindered phenol antioxidant and bis(2, 6-di-t-butyl-4-methylphenyl)pentaerythritol diphosphite as a phosphor-based antioxidant in amounts shown in Table 2 and 400 parts by weight of chloroform were blended with 100 parts by weight of the diisopropyl fumarate homopolymer obtained in Synthesis Example 1 to obtain a solution. Using the solution, a plastic substrate for display having a thickness of 140 μm was obtained in the same manner as in Example 1.

The plastic substrate for display obtained was subjected to evaluations of optical characteristics and thermal stability. The results obtained are shown in Table 2. The plastic substrate for display obtained was excellent in total transmittance and haze. The addition of the antioxidants provided further excellent thermal resistance, and such antioxidants did not affect the optical characteristics such as transparency and haze.

EXAMPLES 9 TO 11

The plastic substrates for display obtained in example 7 without heat treatment (Example 9), with heat treatment for 1 hour at 200° C. (Example 10), and heat treatment for 1 hour at 220° C. (Example 11), were used respectively. Each plastic substrate for display was heated from room temperature to 200° C., retained at such temperature for 1 hour, and then returned to room temperature. Each plastic substrate was subjected to dimensional measurement to evaluate dimensional change rate. The results obtained are shown in Table 3.

The plastic substrate for display obtained with heat treatment shows an extremely excellent dimensional stability.

EXAMPLE 12

0.35 parts by weight of pentaerythritol tetrakis(3-(3,5-di-t-butyl-4-hydroxyphenyl)propionate), 1.05 parts by weight of bis(2,6-di-t-butyl-4-methylphenyl)pentaerythritol diphosphite and 400 parts by weight of chloroform were added to 100 parts by weight of the diisopropyl fumarate homopolymer obtained in Synthesis Example 1 to obtain a solution. Using the solution, a plastic substrate for display having a thickness of 140 μm was obtained in the same manner as in Example 1. The plastic substrate was further heat treated at 220° C. for 1 hour.

The plastic substrate for display obtained was subjected to measurements of haze, moisture permeability and dimensional change rate when the substrate was heated from room temperature to 200° C. or 220° C. and returned to room temperature. The results obtained are shown in Table 4.

EXAMPLES 13 TO 15

On both sides of the plastic substrate for display obtained in Example 12, a silicon nitride film having a thickness of 100 nm was formed by sputtering under conditions of a film forming temperature: room temperature, a background pressure: $1 \times 10^{-7}$ Torr, a sputtering gas pressure: 0.6 Pa (Ar: 80 SCCM, $N_2$: 20 SCCM), and an applied voltage: RF magnetron 500 W. Similarly, plastic substrates for display having a silicon oxide film and a silicon oxide nitride film on both sides were prepared.

The plastic substrates for display obtained were subjected to measurements of haze, moisture permeability and dimensional change rate when the substrate was heated from room temperature to 200° C. or 220° C. and returned to room temperature. The results obtained are shown in Table 4. The formation of the gas barrier film did not increase the haze so much, and the plastic substrate for display bearing the gas barrier layer showed low moisture permeability and low dimensional change rate after heating and cooling.

EXAMPLE 16

The plastic substrate for display obtained in example 12 was subjected to measurements of surface hardness, steel wool resistance and solvent resistance to N-methyl-2-pyrrolidone. The results obtained are shown in Table 5.

EXAMPLE 17

On both sides of the plastic substrate for display obtained in example 12, an ultraviolet curable resin composition composed of 75 parts by weight of an ultraviolet curable urethane acrylate, 10 parts by weight of 1,6-hexanediol acrylate, 10 parts by weight of isobornyl acrylate, 3.5 parts by weight of a photoinitiator (trade name Darocure 1173, manufactured by Ciba Specialty Chemicals Inc.), 1.4 parts by weight of an antioxidant (trade name: Irganox 1010, manufactured by Ciba Specialty Chemicals Inc.) and 0.1 parts by weight of a silicone leveling agent was coated by a coater at a thickness of 4 μm, and the resulting coating was subjected to ultraviolet irradiation under high pressure mercury lamp to obtain a plastic substrate for display having a hard coat layer. It was evaluated in the same manner as in Example 16. The results obtained are shown in Table 5. The plastic substrate for display obtained had excellent surface hardness.

EXAMPLE 18

On the plastic substrate for display having the silicon nitride film obtained in Example 13, an ultraviolet curable resin composition composed of 60 parts by weight of an ultraviolet curable epoxy acrylate, 20 parts by weight of 1,6-hexanediol acrylate, 15 parts by weight of isobornyl acrylate, 3.5 parts by weight of a photoinitiator (trade name Darocure 1173, manufactured by Ciba Specialty Chemicals Inc.), 1.4 parts by weight of an antioxidant (trade name: Irganox 1010, manufactured-by Ciba Specialty Chemicals Inc.) and 0.1 parts by weight of a silicone leveling agent was coated by a coater at a thickness of 4 μm. The resulting coating was subjected to ultraviolet irradiation under high pressure mercury lamp to obtain a plastic substrate for display having a gas barrier layer and a hard coat layer. It was evaluated in the same manner as in Example 16. The results obtained are shown in Table 5. The plastic substrate for display obtained had excellent surface hardness.

EXAMPLE 19

On the plastic substrate for display having the gas barrier layer and the hard coat layer obtained in Example 18, a transparent electrode (ITO) was formed by sputtering (sputtering temperature: 200° C.). A polyimide alignment film was spin coated on the ITO layer, baked at 180° C. for 1 hour and subjected to a rubbing treatment. A spacer was sprayed on the substrate thus prepared, and two substrates were fixed with a sealing agent in such a manner that the rubbing directions were mutually perpendicular. After the sealing agent was hardened, a liquid crystal was injected by vacuum injection, followed by encapsulating with an epoxy resin to prepare a liquid crystal cell.

On both sides of the liquid crystal cell, polarizing films (trade name: NPF, manufactured by Nitto Denko Corp.) were adhered to obtain a liquid crystal display element.

The liquid crystal display element obtained was capable of showing uniform and even display of white and black colors, and was soft and flexible.

TABLE 1

|  | Example 1 | Example 2 | Comparative Example 1 | Comparative Example 2 |
|---|---|---|---|---|
| Total transmittance (%) | 93 | 93 | 88 | 90 |
| Refractive index | 1.47 | 1.47 | 1.66 | 1.59 |
| Abbe's number | 57 | 57 | 27 | 30 |
| Yellowness | 2.2 | 2.1 | 4.2 | 3.0 |
| Photoelastic constant ($\times 10^{-12}$Pa$^{-1}$) | 3 | 3 | 120 | 100 |
| Heat resistance (° C.) | 220 | 220 | 200 | 130 |
| Retardation (nm) | 0 | 3 | 20 | 15 |
| Transmittance (400 nm) (%) | 91 | 91 | — | — |
| Haze (%) | 0.4 | 0.4 | — | — |
| Unevenness in thickness | <1 | <2 | — | — |
| Unevenness in retardation | 0 | <2 | — | — |

TABLE 2

| Example | Phenol anti-oxidant (wt. pts.) | Phosphor anti-oxidant (wt. pts.) | Total transmittance (%) | Haze (%) | Yellowness Initial | Yellowness 220° C. 1 hr. | Yellowness 220° C. 3 hrs. |
|---|---|---|---|---|---|---|---|
| Ex. 3 | 0 | 0 | 93 | 0.3 | 2.2 | 9.2 | 16.0 |
| Ex. 4 | 0 | 0.35 | 93 | 0.2 | 2.1 | 8.5 | 15.3 |
| Ex. 5 | 0.15 | 0 | 93 | 0.3 | 2.3 | 4.2 | 12.3 |
| Ex. 6 | 0.15 | 0.35 | 93 | 0.3 | 2.2 | 2.3 | 5.8 |
| Ex. 7 | 0.35 | 1.05 | 93 | 0.4 | 2.4 | 2.4 | 2.5 |
| Ex. 8 | 0.70 | 2.10 | 93 | 0.4 | 2.4 | 2.6 | 2.8 |

TABLE 3

| Example | Heat treatment temperature (° C.) | Heat treatment time (hr.) | Dimensional change rate (%)[1] |
|---|---|---|---|
| Example 9 | None | None | 0.27 |
| Example 10 | 200 | 1 | 0.04 |
| Example 11 | 220 | 1 | 0.02 |

[1]Dimensional change rate after heating from room temperature to 200° C., allowing to stand for 1 hour and cooling to room temperature: [(dimension before heating − dimension after heating)/dimension before heating] × 100.

TABLE 4

| Example | Haze (%) | Moisture permeability (g/m$^2$/day) | Dimensional change rate (200° C.)(%) | Dimensional change rate (220° C.)(%) | Gas barrier layer |
|---|---|---|---|---|---|
| Example 12 | 0.4 | 48 | 0.02 | 0.12 | None |
| Example 13 | 1.0 | <0.1 | <0.01 | 0.01 | Silicon nitride |
| Example 14 | 0.9 | <0.1 | <0.01 | 0.01 | Silicon oxide |
| Example 15 | 0.8 | <0.1 | <0.01 | 0.01 | Silicon oxide nitride |

TABLE 5

| Example | Gas barrier treatment | Hard coat treatment | Haze (%) | Surface hardness | Steel wool resistance | Solvent resistance (NMP) |
|---|---|---|---|---|---|---|
| Example 16 | None | None | 0.4 | HB | Scratched | Whitening |
| Example 17 | None | Present | 0.5 | 2H | No scratch | No change |
| Example 18 | Present | Present | 1.0 | 3H | No scratch | No change |

What is claimed is:

1. A flat panel display element, comprising:
an optically transparent display component which comprises a plastic substrate, the substrate comprising a fumaric acid diester resin which comprises 60 mol % or more of a fumaric acid diester residue unit represented by the following formula (1):

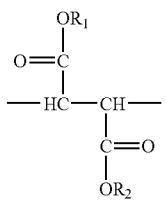

wherein $R^1$ and $R^2$ each independently represent a branched alkyl group or a cyclic alkyl group, having 3–12 carbon atoms, said resin having a number average molecular weight of 1,000–500,000, as determined by a gel permeation chromatography and converted into standard polystyrene; wherein the substrate has a thickness of 30–600 μm, an unevenness in the thickness of 10 μm or less, a retardation of 10 nm or less, as measured from a front of the substrate, and an unevenness in the retardation of 5 nm or less within a plane of the substrate.

2. The flat panel display element as claimed in claim 1, wherein the substrate comprises a fumaric acid diester homopolymer which comprises 100 mol % of fumaric acid diester residue units having formula (1).

3. The flat panel display element as claimed in claim 1, wherein the substrate comprises 100 parts by weight of the fumaric acid diester resin, 0.01 to 10 parts by weight of an antioxidant comprising a hindered phenol-based antioxidant and a phosphor-based antioxidant in a weight ratio of 100/0 to 100/1000.

4. The flat panel display element as claimed in claim 1, wherein the substrate is a monoaxially stretched film or a biaxially stretched film.

5. The flat panel display element as claimed in claim 1, wherein the substrate has an optical transmittance of 80% or higher at a measurement wavelength of 400 nm and a haze of 2% or less based on JIS K7105 (1981 edition).

6. The flat panel display element as claimed in claim 1, wherein the substrate has a dimensional change rate of 0.1% or less, as an absolute value, when the substrate is retained at 200° C. for 1 hour and then returned to room temperature.

7. The flat panel display element as claimed in claim 1, wherein the display component is a laminate of the substrate and at least one gas barrier layer.

8. The flat panel display element as claimed in claim 7, wherein the gas barrier layer comprises a material selected from the group consisting of silicon nitride, silicon oxide and silicon oxynitride.

9. The flat panel display element as claimed in claim 1, wherein the display component is a laminate of the substrate and at least one hard coat layer.

10. The flat panel display element as claimed in claim 9, wherein the hard coat layer comprises an ultraviolet curable resin.

11. The flat panel display element as claimed in claim 1, wherein the display component is a laminate of the substrate, at least one hard coat layer and at least one gas barrier layer.

12. The flat panel display element as claimed in claim 1, wherein the substrate comprises a copolymer which is formed by the copolymerization of a fumaric acid diester monomer with a polymerizable comonomer selected from the group consisting of styrene, α-methylstyrene, acrylic acid, acrylic acid ester, methacrylic acid, methacrylic acid ester, a vinyl ester, acrylonitrile, methacrylonitrile and an olefin.

13. A liquid crystal display element, comprising:
an optically transparent display component which comprises a plastic substrate, the substrate comprising a fumaric acid diester resin which comprises 60 mol % or more of fumaric acid diester residue units having the following formula (1):

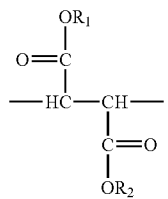

wherein $R_1$ and $R_2$ each independently represent a branched alkyl group or a cyclic alkyl group, having 3–12 carbon atoms, said resin having a number average molecular weight of 1,000–500,000, as determined by a gel permeation chromatography and converted into standard polystyrene; wherein the substrate has a thickness of 30–600 μm, an unevenness in the thickness of 10 μm or less, a retardation of 10 nm or less, as measured from a front of the substrate, and an unevenness in the retardation of 5 nm or less within a plane of the substrate.

14. The liquid crystal display element as claimed in claim 13, wherein the substrate is comprised of a fumaric acid diester homopolymer which is comprised of 100 mol % of fumaric acid diester residue units having formula (1).

15. The liquid crystal display element as claimed in claim 13, wherein the substrate comprises 100 parts by weight of the fumaric acid diester resin, 0.01 to 10 parts by weight of an antioxidant comprising a hindered phenol-based antioxidant and a phosphor-based antioxidant in a weight ratio of 100/0 to 100/1000.

16. The liquid crystal display element as claimed in claim 13, wherein the substrate is a monoaxially stretched film or a biaxially stretched film.

17. The liquid crystal display element as claimed in claim 13, wherein the substrate has an optical transmittance of 80% or higher at a measurement wavelength of 400 nm and a haze of 2% or less based on JIS K7105 (1981 edition).

18. The liquid crystal display element as claimed in claim 13, wherein the substrate has a dimensional change rate of 0.1% or less, as an absolute value, when the substrate is retained at 200° C. for 1 hour and then returned to room temperature.

19. The liquid crystal display element as claimed in claim 13, wherein the display component is a laminate of the substrate and at least one gas barrier layer.

20. The liquid crystal display element as claimed in claim 19, wherein the gas barrier layer comprises a material selected from the group consisting of silicon nitride, silicon oxide and silicon oxynitride.

21. The liquid crystal display element as claimed in claim 13, wherein the display component is a laminate of the substrate and at least one hard coat layer.

22. The liquid crystal display element as claimed in claim 21, wherein the hard coat layer comprises an ultraviolet curable resin.

23. The liquid crystal display element as claimed in claim 13, wherein the display component is a laminate of the substrate, at least one hard coat layer and at least one gas barrier layer.

24. The liquid crystal display element as claimed in claim 13, wherein the substrate comprises a copolymer which is formed by the copolymerization of a fumaric acid diester monomer with a polymerizable comonomer selected from the group consisting of styrene, α-methylstyrene, acrylic acid, acrylic acid ester, methacrylic acid, methacrylic acid ester, a vinyl ester, acrylonitrile, methacrylonitrile and an olefin.

* * * * *